N. W. DALTON.
STREAMLINED SHOCK ABSORBER.
APPLICATION FILED NOV. 11, 1916.

1,246,021.

Patented Nov. 6, 1917.
2 SHEETS—SHEET 1.

Inventor
NELSON W. DALTON.

By John P. Zarbey
Attorney

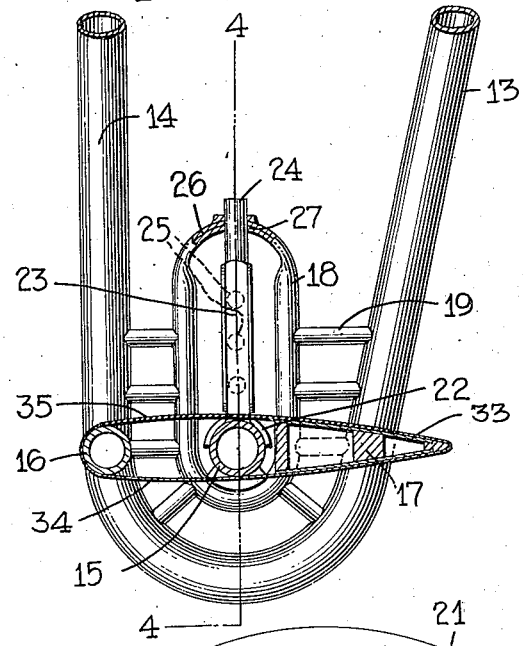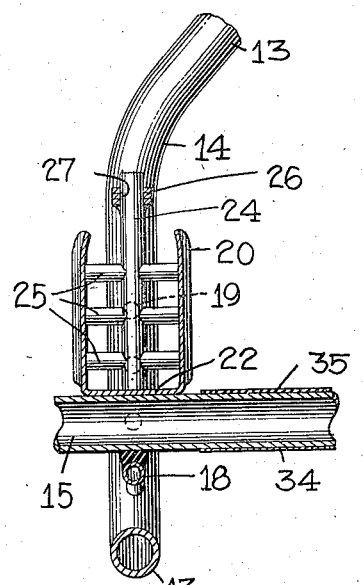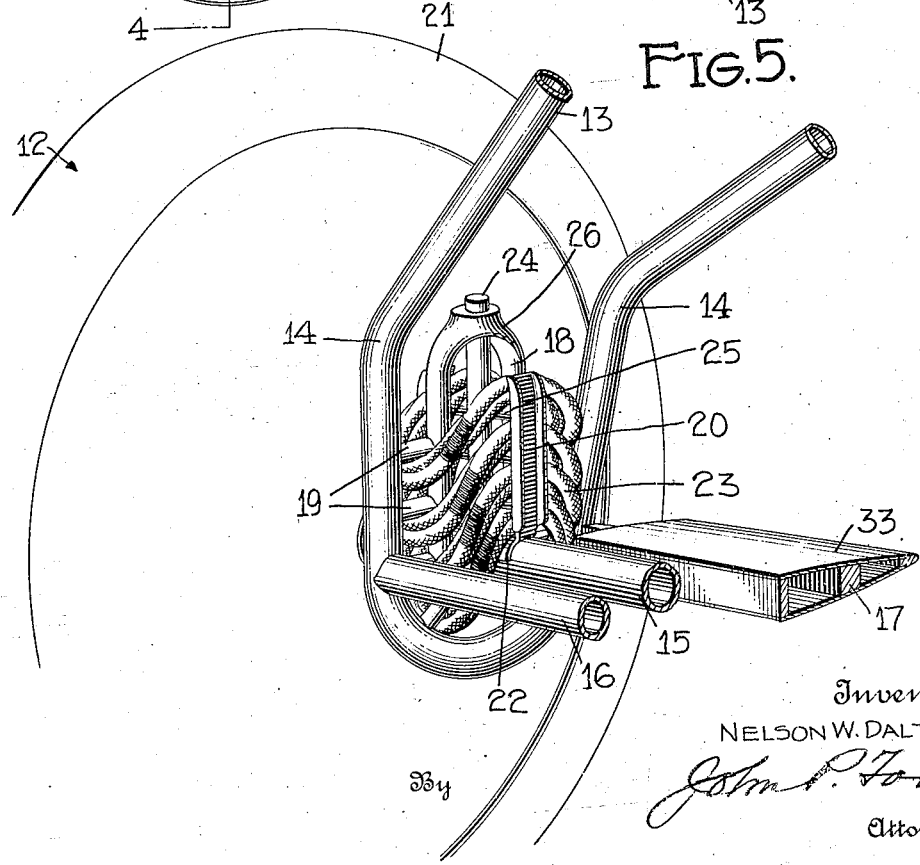

UNITED STATES PATENT OFFICE.

NELSON W. DALTON, OF BUFFALO, NEW YORK, ASSIGNOR TO CURTISS AEROPLANE AND MOTOR CORPORATION, A CORPORATION OF NEW YORK.

STREAMLINED SHOCK-ABSORBER.

1,246,021.

Specification of Letters Patent.

Patented Nov. 6, 1917.

Application filed November 11, 1916. Serial No. 130,810.

*To all whom it may concern:*

Be it known that I, NELSON W. DALTON, a citizen of the United States, residing at Buffalo, in the county of Erie and State of New York, have invented certain new and useful Improvements in Streamlined Shock-Absorbers, of which the following is a specification.

My invention relates to landing gear for aircraft. Many advantages and several novel features characterize the invention but the principal innovation is to be found in the construction and relative arrangement of the shock absorber and chassis or landing gear struts.

Aeronautical engineers have long appreciated the detrimental effect of extending the landing gear axle considerably beyond the chassis struts. To do so weakens the landing gear by increasing the leverage on the axle under the impact of landing and at the same time necessitates an arrangement of the landing gear wheels in widely spaced relation to the struts. Moreover, the head resistance incident to flight is in this way considerably augmented. The V-arrangement of struts now used in landing gear construction is, however, admittedly preferred. Struts so arranged are stronger and more compact although lack of space in the V of the struts at the bight has heretofore prevented a compact anchorage of the shock absorber elastics. These elastics (if the struts are V-arranged) either extend longitudinally of the axle beneath the V and over the axle, or transversely of the axle without the plane of the struts. The elastics collectively, in either instance, sustain the weight of the machine.

By the present invention it is proposed to avoid the structural disadvantages and retain the structural advantages herein pointed out. First, it is proposed to V-arrange the struts; second, to considerably reduce in weight, length and size the landing gear axle; third, to mount the landing gear wheels close up beside the V-arranged struts; fourth, to construct the anchorages for the shock absorber elastics in a manner providing for their arrangement in the plane of the struts; fifth, superpose the anchorages in unalined planes; sixth, inclose the shock absorbers in a casing of streamline form but little thicker than the struts; seventh, brace the V-struts at the bight thereof by the arrangement of certain of the anchorages therein; and finally, effectually streamline the axle throughout.

Briefly outlined, the invention may be described as follows: Tubular substantially V-shaped landing gear struts are provided. Mounted in the V of each strut is a substantially elliptical guide having its sides connected respectively with the legs of the V-struts by transverse welded tubular sections to form between said sides and the V a lattice work. A wheel axle crosses the V-strut at the bottom of its bight. On the axle is mounted a saddle having a cross tree post welded to it in the plane of the guide and having its free end projecting through an opening formed therein. The cross tree arms on the post lie in the plane of the axle. By lacing a number of individual shock absorber elastics under the latticed tubes between the guide and legs of the V-strut and over the cross tree arms, landing shocks are absorbed and the elastics individually distended. Moreover, quick action is induced by the distribution of load equally upon the several elastics. The V-struts are to be flared outwardly from the side of the body of the craft and thence downwardly and more nearly vertical with a view to imposing a direct thrust upon the cross tree post and preventing undue side slip.

In the drawings, wherein like characters of reference denote like or corresponding parts throughout the several views:

Fig. 3 is a detail view of the intersecting anchorages, V-struts, and axle (partly in elevation and partly in section);

Fig. 4 is a section on the line 4—4, Fig. 3, and

Fig. 5 is a perspective view illustrating one shock absorber complete.

Figure 1:
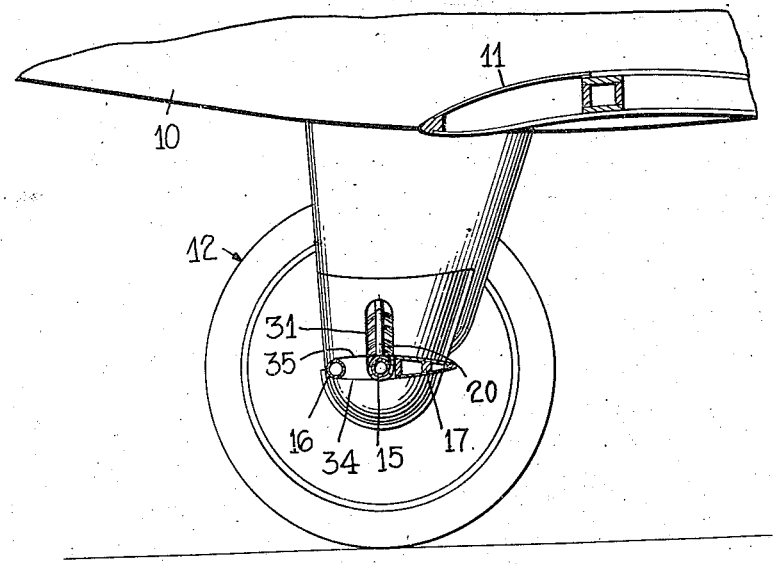
Figure 1 is a part sectional and part elevational view illustrating the improvements proposed.

In the embodiment of my invention selected for illustration, 10 designates the fuselage or body of the craft, 11 the aeroplane or supporting surfaces and 12 in its entirety the landing gear. Substantially V-arranged struts 13 engage at one end the underneath surface of the fuselage 10 at which point they are fastened by any suitable means. These struts, collectively constituting what I shall hereinafter term opposed V-struts, flare outwardly from the bottom of the fuselage 10 to a point 14 and thence downwardly and more nearly vertical (see Fig. 2) the substantially parallel terminals of the opposed V-struts together providing a mounting for the landing gear axle 15 arranged with its terminals crossing the opposed struts at the bights or connecting portions thereof. By this arrangement, as intimated, a direct thrust on the axle is obtained and all tendency to side slip avoided. Fore and aft braces designated respectively 16 and 17 interconnect the V-struts at the foot thereof. The manner in which these braces are streamlined as a unit with the axle 15 will be hereinafter more fully described.

A substantially elliptical guide 18 is provided at the apex of each V, the legs of the V lying in the plane of the guide. Tubular sections 19 form with the guide 18 a lattice work, the sections, for the most part extending parallel and in spaced relation intermediate the sides of the guide and said legs. These sections may be welded, brazed or made integral with the guide and legs by any suitable means.

Upon reference to Fig. 3 it will be noted that the lattice work formed by elements 18 and 19 serves a two-fold purpose. By its integral formation with the legs at the foot of the V-struts the said legs are interconnected and effectually braced. By superposing the tubular sections or arms 19 they individually function as anchorages for a multiple number of rubbers or elastics 20.

Figure 2:
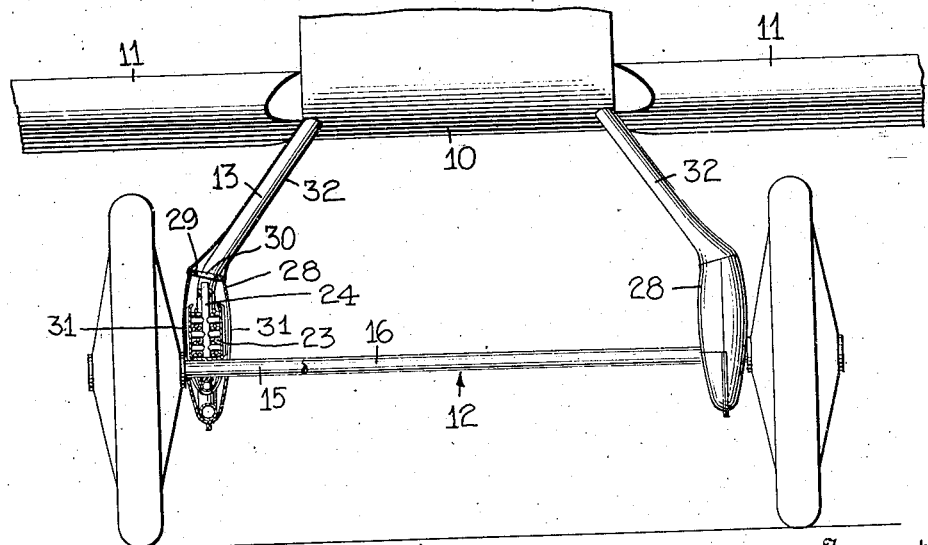
Fig. 2 is the front elevation, partly broken away.

The terminals of the axle 15 extend through the respective elliptical guides 18 and laterally considerably therebeyond, the extended terminals providing appropriate mountings for landing gear wheels 21. By locating the lattice work intermediate the legs of the V-struts and in the plane thereof, the landing gear wheels may be mounted close up beside the said struts as illustrated in Fig. 2. The enormous bending moment on the axle 12 under the impact of landing is in this way very materially lessened, and the axle in length, weight and size appreciably reduced.

Adjacent the terminals of the axle 15 and in the vertical plane thereof there is provided a saddle 22, the ends of which are upturned as indicated at 23 to afford with a center cross tree post 24 suitable supports for a multiple number of cross tree arms 25. The saddles 22 bear directly against the axle terminals in the plane of the V-strut terminals to intersect or extend across the guides 18.

The cross tree arms 25 may be also described as anchorages for the elastics 20. The elastics, it will be noted, extend up and over the cross tree arms 25 and down and under the arms or tubular sections 19. Each series or set of elastics is in this way independent, acting and in practice is individually distended to secure an equal distribution of load throughout the lattice work formed by the elements 18 and 19 and throughout the cross tree formed primarily by the elements 22, 23, 24 and 25.

The guides 18, at one end, are flattened as indicated at 26, these flattened portions each having an opening 27 formed in them for the reception of the respective cross tree posts 24.

It is entirely practical, in veiw of the superposed or vertical arrangement of anchorages, to inclose each shock absorber in a casing of streamline form. The casings, designated each as an entirety by the numeral 28, are fastened by any suitable means and in each instance to a bridge 29 apertured as indicated at 30. These bridges interconnect the legs of the V-struts in planes intermediate the bottom of the fuselage and the landing gear axle. Said openings 30 afford operating space for the cross tree posts 24. Openings 31 are formed in each casing 28 to provide operating space for the axle 15 which extends therethrough. Slight movement of the axle with respect to the V-struts is bound to occur under the enormous impact of landing.

Both legs of the opposed V-struts 13 are streamlined as a unit by continuing the casings 28 upwardly from the bridge 29 of each V-strut to the underside of the fuselage 10. That portion of the casing streamlining the upwardly converging V-struts is designated 32.

Ordinarily the landing gear axle is streamlined by fairing grooved to accommodate the axle. In the present instance, however, this arrangement is undersirable in view of the forward landing gear brace 16. In flight, the axle 15 and brace 16 not only extend parallel but lie in the same horizontal plane. In landing, however, the weight of the machine forces the said parts, against tension of the elastics 20, into unalined or different planes. With this in view it is still proposed to streamline the said parts as a unit by the use of a streamlining structure distendable in form. Said structure, in its preferred embodiment comprises a framework 33 of which the cross brace 17 is a part, an inelastic fabric underneath covering 34 (preferably linen), and an elastic top covering 35 (preferably rubber cloth), the fabric connecting the structure 33 and the forward brace 16 in a manner continuing the lines of the latter rearwardly in streamline form to said structure 33 and the elastic covering 34 connecting the said parts to correspondingly continue the said lines of the brace 16 aft to the structure 33 only when said brace and the axle 15 lie in alined or corresponding planes. At other times, the elastic covering 35 is distended or stretched and the streamlining effect disrupted.

By the arrangement disclosed, the resistance to flight at the landing gear is cut to the minimum and the shock absorbers arranged compactly at the bights of the V-struts and in the planes of the V-strut legs. The provision of vertically extending anchorages for the shock absorber elastics is certainly advantageous in view of the ease with which the various parts of the landing gear may be streamlined. To secure lightness, the struts, anchorages, braces and other parts of the landing gear may be constructed of metal tubing.

While in the foregoing there has been illustrated in the drawings and described in the specification such combination and arrangement of elements as constitute the preferred construction or embodiment of this invention, it is nevertheless desired to emphasize the fact that interpretation of the invention should only be conclusive when made in the light of the subjoined claims.

What is claimed is:

1. A landing gear for aircraft including relatively movable landing gear parts, a multiple number of shock absorber elastics interconnecting said parts, and a plural number of superposed anchorages for said elastics mounted respectively upon each part.

2. A landing gear for aircraft including relatively movable landing gear parts, a multiple number of individually distendable shock absorber elastics interconnecting said parts, and a plural number of superposed anchorages for said elastics mounted respectively upon each part, the planes of the superposed anchorages intersecting.

3. In a landing gear for aircraft, shock absorber elastics, and superposed anchorages for said elastics arranged in intersecting tiers.

4. In a landing gear for aircraft, a fixed part of latticed form, a movable part of latticed form, and a multiple number of individually distendable elastics arranged for contact with the respective latticed parts.

5. In a landing gear for aircraft, landing gear struts arranged in pairs, shock absorber elastics mounted at the foot of each pair of struts, and anchorages for said elastics mounted intermediately and in the plane of the struts constituting each pair.

6. In a landing gear for aircraft, V-arranged landing gear struts, and superposed anchorages for shock absorber elastics arranged in the plane of the respective V-struts.

7. In a landing gear for aircraft, V-arranged landing gear struts, and shock absorbers constructed for fitting engagement within the V and above the bight of the respective landing gear struts.

8. In a landing gear for aircraft, landing gear struts, shock absorber elastics, and superposed anchorages for said elastics arranged to interconnect and brace adjacent struts.

9. In a landing gear for aircraft, V-arranged landing gear struts, shock absorber elastics, and anchorages for said elastics arranged adjacent the bight of said V-struts to interconnect and brace said struts.

10. In a landing gear for aircraft, V-arranged landing gear struts, and a landing gear shock absorber including superposed anchorages constructed for fitting engagement in the V of the respective struts.

11. In a landing gear for aircraft, landing gear struts, shock absorber elastics, and superposed anchorages for said elastics interconnecting and bracing adjacent struts.

12. In a landing gear for aircraft, superposed anchorages arranged with their planes intersecting, and shock absorber elastics laced for contact with said anchorages.

13. In a landing gear for aircraft, V-arranged landing gear struts, superposed anchorages arranged in the plane of the respective struts, and shock absorber elastics laced for contact with said anchorages.

14. In a landing gear for aircraft, superposed anchorages arranged with their planes intersecting, and a multiple number of individually distendable shock absorber elastics laced for contact respectively with said anchorages.

15. In a landing gear for aircraft, landing gear struts, an axle, strut-borne superposed anchorages, intersecting axle-borne superposed anchorages, and shock absorber elastics arranged for contact with the respective anchorages.

16. A landing gear for aircraft including substantially V-arranged struts, shock absorber devices mounted at the foot thereof, and means respectively inclosing associated shock absorber devices and V-struts to streamline the two as a unit.

17. A landing gear for aircraft including opposed V-arranged landing gear struts extended angularly outwardly beyond the sides of the body of the craft and thence downwardly substantially vertically, together with shock absorber means mounted within the V of each strut above its bight but beneath the angularly extended portion thereof.

18. A landing gear for aircraft including an axle, opposed landing gear struts angularly extended throughout a portion of their length but vertical at their points of intersection with said axle, shock absorber devices mounted respectively adjacent the vertically extended portion of each strut, and means streamlining each strut and its associated shock absorber device as a unit.

In testimony whereof I affix my signature.

NELSON W. DALTON.